Sept. 18, 1956   J. ROCKOFF ET AL   2,763,208
POROUS RUBBER PRODUCTS SUCH AS PRINTING MEMBERS AND
THE LIKE, AND METHOD FOR MANUFACTURE OF THE SAME
Filed Feb. 4, 1953

*INVENTOR.*
JOSEPH ROCKOFF
DANIEL A. MEYER
BY
ATT'Y.

United States Patent Office 2,763,208
Patented Sept. 18, 1956

2,763,208

POROUS RUBBER PRODUCTS SUCH AS PRINTING MEMBERS AND THE LIKE, AND METHOD FOR MANUFACTURE OF THE SAME

Joseph Rockoff and Daniel A. Meyer, Dayton, Ohio, assignors to The Dayton Rubber Company, a corporation of Ohio Application February 4, 1953, Serial No. 335,084

11 Claims. (Cl. 101—367)

The present invention relates to porous rubber products and to a method for manufacturing the same. It relates more particularly to porous rubber printing members for use in printing rolls, plates, and the like, as well as to other porous products adapted for the application or coating of fluids to other materials.

In the field of printing, rubber rolls and plates have heretofore been formed having porous surface areas for the purpose of retaining and/or transferring ink to type or to other printing members in a printing apparatus. One such product is composed of vulcanizable comminuted rubber material admixed with granules of soluble salt which composition is vulcanized under pressure and then leached for the dissolution of the soluble material. This type of product has been found to be suitable as an ink retaining and ink transferring member, although it possesses certain disadvantages with respect to complete removal of the soluble material and control of the size of the pores and porosity of the final product. Other attempts have been made to utilize chemically blown sponge by incorporating a chemical blowing agent in a mass of rubber followed by thermal decomposition of the blowing agent to form pores in said mass. This type of porous rubber has not been fully satisfactory for the purpose due to the fact that the material did not possess a full interconnected cell structure and hence, its ink retaining and ink releasing properties were not satisfactory for the purpose. Latex foam sponge which has an interconnecting cell structure is satisfactory for certain types of applications, but possesses the disadvantage that the material is relatively soft and possesses a high degree of porosity accompanied by a relatively large cell side so that its field of application is rather limited. Another type of product has been formed by compressing the finely divided material, such as metal, powder, graphite, or the like, to form a coherent mass having a certain degree of porosity. Such materials have been found either to lack the proper degree of porosity or where a suitable porosity can be obtained, have been found to be brittle, sensitive to shock, and to possess other disadvantages.

In accordance with applicant's invention a novel type of porous rubber product, together with a method for its manufacture, has been discovered which will possess a highly satisfactory ability to retain and yield fluids such as ink, and which can be made with a controlled degree of porosity and hardness thereby lending this product a high degree of applicability to various types of printing as well as other uses involving the application of fluid materials.

It is therefore an object of the present invention to provide a novel type of porous rubber product which shall have a high ink retaining capacity and will at the same time permit the release of ink in a desired manner.

It is a further object of the present invention to provide a novel method for the manufacture of porous rubber materials having the desired fluid retaining and releasing properties.

It is still a further object of the present invention to provide a novel product and a method for its manufacture which product shall be composed of rubber material and shall have a controled degree of porosity and hardness together with an inter-connected cell structure, and which shall also have great resistance to wear and shock.

It is an additional object of the present invention to provide an improved printing and inking roll which shall be useful for a large variety of applications in the printing field.

Other objects will become apparent from the examination of the appended disclosure.

The product of applicant's invention consists of a porous rubber mass having high ink absorbing and retaining capacity and yet having sufficient resiliency to resist breakage under normal conditions of use. The product is prepared by incorporating with a powdered or finely divided rubber compound a small amount of chemical blowing agent. The resulting mixture is introduced into a mold wherein it is confined while the mixture is subjected to temperatures sufficient to decompose the blowing agent and liberate the gases of the volatile material therefrom. The resulting pressure within the mold appears to compress the powdered mass to cause cohesion of the individual rubber particles. The mere compression of such a mass of powdered rubber will produce a product having a certain degree of porosity, but which will have a substantially closed cell structure. The presence of the blowing agent and the liberation of the volatile material appears to function by disrupting the bonds between adjacent particles thereby creating a microporous communicating cell structure within the mass. It must be emphasized that the blowing agent when used, is incorporated not as an ingredient or component of the rubber itself, but in the form of separate and discrete particles which are admixed with the rubber particles prior to compression and blowing. The incorporation of the blowing agent within the rubber will not produce the desired type of inter-connected cell structure. The product may be formed by the method generally described above, but with certain variations in procedure which are described below.

(a) A powdered unvulcanized rubber material is obtained which has been formed by spray drying of a rubber latex. Where oil-resistant properties are desired, this latex may be of an oil-resistant synthetic rubber, such as a butadiene-acrylic nitrile copolymer latex. This latex may have been compounded with vulcanizing agents, accelerators, antioxidants, fillers, and conventional rubber compounding materials prior to spray drying, or these materials may be admixed with the powdered rubber as such. The powdered rubber is then blended with a desired proportion of a chemical blowing agent which proportion will depend upon the nature of the agent and the final degree of porosity desired. Proportions of blowing agents which may be used will vary, but a preferred range will be from about one percent to about forty percent by weight based on the rubber in the product. The powdered mixture is then introduced into a mold having the shape of the finally desired product or may be molded in any other shape and the final product may be made by grinding or other shaping methods. The closed mold is then subjected to vulcanizing temperatures during which the blowing agent is decomposed and the pressure within the mold will be exerted upon the particles causing them to cohere. At the same time the liberated gas will disrupt the bonds between the particles, and after the vulcanization is completed and the product removed from the mold a rubber material having a high degree of porosity will result. The following is an example of one type of procedure and composition which may be used in preparing a relatively hard yet resilient and porous inking roll by this method. A mixture of the following composition is prepared:

| | Parts by weight |
|---|---|
| Hycar (40% acrylic nitrile–60% butadiene copolymer) | 100 |
| Sulfur | 15 |
| Vulcanization accelerator | 1 |
| Zinc stearate | 1 |
| Blowing agent (ammonium bicarbonate) | 20 |

The Hycar was obtained in the form of a powder prepared by spray drying a latex of a perbunan type of synthetic rubber. The powdered rubber was sifted through a 30 mesh sieve and then was blended with the other materials which were also in powdered form. After blending, the whole mixture was then put through a 30 mesh screen. The resulting mixture was then packed into a mold within which a small metal shaft of suitable size was centered. The mold was then closed tightly and subjected to a temperature of 300° F. for sixty minutes. The resulting decomposition of the ammonium bicarbonate exerted a substantial degree of pressure within the mold and caused the rubber particles to cohere during the vulcanization. The resulting product was removed from the mold and was found to have a desirable degree of porosity and ink retaining ability, and functioned satisfactorily as an inking roll in a token or machine of the type which prints from direct reading type.

(b) As a variant of the foregoing method, the powdered rubber material instead of being packed loosely into the mold may be compressed or preformed to a shape equal to or smaller than the dimensions of the mold prior to introduction therein. In this way a higher degree of density may be obtained with the resultant finer pored product. In carrying out this method, a composition similar to that referred to under (a) may be used, except that the powdered blend of rubber with the other ingredients is preformed under a pressure of about 200 pounds per square inch to about 40 percent of the apparent volume of the original mixture. This is done by using a small arbor press to form a cylindrical pellet corresponding to the shape of the desired roll. This pellet is then placed in a mold having a volume about 30 percent greater than the volume of the pellet. The mold is closed and subjected to a temperature of about 300° F. for a period of one hour. During this time the rubber particles become vulcanized together in the form of a loose, porous mass and the ammonium bicarbonate decomposes with accompanying disruption of a substantial proportion of the cell walls to form an interconnected structure. On completion of the heating step the mold is opened and the gas released. The resulting product is found to have a highly porous, interconnected cell structure having a high degree of ink retaining ability.

(c) The powdered rubber may be obtained by freezing compounded unvulcanized natural rubber and grinding the material while in a frozen state. This may be accomplished by freezing the rubber in the presence of Dry Ice and conducting the grinding operation while simultaneously introducing powdered Dry Ice into the grinding equipment. The resulting granular rubber product is then admixed with the chemical blowing agent and introduced into a mold in the compressed or uncompressed condition as described above.

(d) Powdered partially vulcanized rubber material may be obtained by grinding or comminuting in any known manner as by the use of freezing, grinding with abrasive wheels, or the like. This partially vulcanized, powdered rubber may then be admixed with the chemical blowing agent and introduced into a mold, preferably after having been compressed to at least the dimensions of the mold. The material is then subjected to temperatures sufficient to decompose the blowing agent and complete the vulcanization, and the particles are subjected to sufficient pressures to cause cohesion accompanied by disruption of the bonds between the particles. After this has been done, the final product is a porous rubber material having an interconnected cell structure.

(e) Although the products prepared by the foregoing procedures were found to possess a desirable degree of porosity, as well as ink retaining capacity, it was found that for certain applications a greater degree of strength and durability was desirable. As a result of considerable experimentation, it was discovered that highly desirable results were obtained by incorporating as an additional component, a minor proportion by weight based on the rubber, of a granular or powdered resin in addition to the other powdered materials. It was discovered that the resin functioned by forming a bond between the rubber particles during the vulcanization and blowing operation. Upon solidification after vulcanization was completed, this bond appears to enhance substantially the strength of the final product. In addition, the resin film between the rubber particles appears to be penetrated by the gaseous material liberated during the blowing operation to give an increased degree of porosity and to insure a suitable interconnected cell structure. Although either natural or synthetic resins may be used, the synthetic resins are generally preferred because of more desirable properties and lower cost. Although either thermosetting or thermoplastic resins may be used, thermosetting resins are generally preferred because of their better shape retaining properties upon removal of the hot product from the mold, and also because they become solid at vulcanizing temperatures. In case thermoplastic materials are used, it would be necessary to allow the mold to cool before removal of the products. Thermosetting resins are used in an incompletely polymerized state so that during heating or vulcanization the material will pass through a soft or tacky stage and will thereby facilitate cohesion between the rubber particles. Suitable thermosetting resins are the phenol-aldehyde or urea-aldehyde types or other thermosetting materials which are obtained in powdered or granular form. In certain instances, it is also possible to use solutions or suspensions of these resins in volatile solvents, and these solutions or suspensions may be admixed with the powdered rubber and other ingredients to form a moist or doughy mass. The solvent is then evaporated prior to effecting blowing or vulcanization. Typical thermoplastic resins which may be used are polyvinyl acetate, polyvinyl chloride, polystyrene-butadiene copolymers, and the like. The natural resins, such as shellac or the like, in granular form may also be used. As one example of the use of a thermosetting resin in the process described, the procedure and formulation referred to in paragraph (a) above may be utilized incorporating in addition 30 parts by weight of a Durez resin which is a cashew nut shell oil-phenol-aldehyde polymer obtained in granular form. The resin was ground so that it would pass through a 30 mesh sieve in order to become suitably blended with the other particles. In other respects the procedures were the same as that set forth in paragraphs (a) to (d), inclusive, above, and the resulting products were found to be highly porous and ink retaining, and had the property of yielding ink on contact at very little pressure with a printing plate or other material. A small roll made to fit a portable token printing machine, and which operates by inking a sales slip or the like which is in contact with a plate or token having raised letters, was found to perform excellently without re-inking for upwards of 30,000 impressions. This roll was made in accordance with the procedure set forth in paragraph (b) above. This roll had a Shore A durometer hardness of 100, excellent strength, a density of 0.85 gram per cc., and an ink absorption of 0.13 gram per cc. An additional discovery which was made in connection with the use of a resin as a component of the powdered mixture, resides in the fact that the use of fully vulcanized rubber particles is made feasible thereby. Such particles are not satisfactory without the powdered resin material since the vulcanized particles do not have sufficent cohesion at vulcanizing temperatures to give a cohered, unitary product. However, by the use of resins of the type referred to herein, fully vulcanized rubber particles, which may be produced by grinding or otherwise, may be utilized. Fusion or softening of the resin during heating serves to blend the particles in a coherent mass and permits the formation of an interconnected cell structure by disruption of these bonds by the liberated gaseous materials.

While oil-resistant types of synthetic rubber, such as the perbunan or Hycar material referred to above, are generally preferred where certain types of ink are utilized, in many cases neoprene or natural rubber or non-oil-resistant types of synthetic rubber, such as the butadiene-styrene copolymers, may also be used. A typical formulation for such a compound is shown below:

| | Parts by weight |
|---|---|
| Smoked sheet | 100 |
| Clay | 50 |
| Zinc oxide | 5 |
| Sulfur | 20 |
| Accelerator | 1 |
| Antioxidant | 1 |
| Stearic acid | 2 |
| Plasticizer | 5 |

The rubber is prepared or obtained in granular form in the manner set forth above and blended with the other parts of the ingredients in the manner described. In general, mesh sizes of 30 or smaller are preferred, although coarser particles may be used in many cases.

The degree of hardness to be obtained is governed by a number of factors and may be readily controlled. For many applications a fairly soft roll is desirable, where for others one which is quite hard is preferred. For most purposes a Shore A durometer hardness of 60 to 100 is quite suitable.

The degree of porosity is determined by the proportion of blowing agent used, as well as by the amount of confinement of the material during molding. A range of porosity of from 5 percent to 75 percent which represents the volume of the pores in a given volume of product, is entirely feasible by following the foregoing procedures. Various types of blowing agents may be used, these being well known to the art. The most common of these are the alkali metal carbonates and bicarbonates, the most common of which is sodium carbonate and bicarbonate and ammonium carbonate and bicarbonate. Organic blowing agents, such as diazo amino benzene, are also highly satisfactory.

The resin which was referred to as a preferred component may be used in any desired proportion so long as a suitable degree of porosity is obtained. In general, however, it is not desirable to use more than 100 parts of the resin per 100 parts of rubber, nor less than 5 parts of resin per 100 parts of rubber. A preferred range of proportions is from 15 to 50 parts by weight of the resin based on 100 parts of rubber.

The final product prepared in the manner described above may either be formed initially in the desired size and shape or may be formed in sheets, plates, or rods which may be shaped by cutting or otherwise to give the final desired product. In the case of printing rolls, for example, the material may be molded around cores in the shape of individual rolls or may be molded in the form of rods which are then cut to the desired size. If the product is to be used as an inking roll, it is impregnated with ink by immersion, or if the rate of impregnation is desired to be increased, the product may be immersed in ink and then heated. Pressure may also be used to facilitate the incorporation of the ink, or the material may be evacuated and the ink drawn into the pores by vacuum. Rolls produced according to this invention may be used in printing devices using token type printing plates, such as described in United States Patents No. 2,587,612 or No. 2,606,494. The product produced in accordance with the present invention may be used in forming printing members of the type described, for example, in United States Patents No. 2,353,877, No. 2,349,613, No. 2,392,521, and the like. In the utilization of this material as an inking roll, it has been found to have exceptionally advantageous properties due to the ability of the material to release ink merely upon contact and without the application of pressure. This appears to be due to the surface characteristics of the rubber compound and the capillary structure which is formed within the product. The product of this invention and the method for its manufacture are illustrated with reference to the accompanying drawings, in which:

Figure 1:
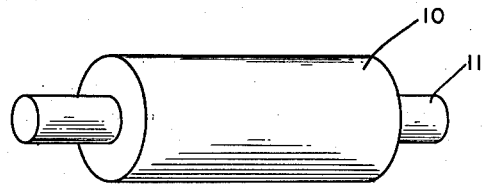
Figure 1 is a view in elevation of a printing or inking roll.

In the drawings, Figure 1 illustrates a covering 10 composed of the porous material of the present invention mounted upon a metal shaft or core 11.

Figure 2:
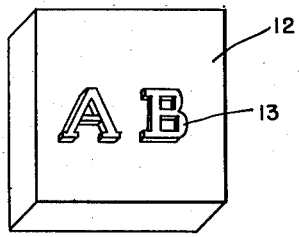
Figure 2 is a view in elevation of a portion of a printing plate having indicia molded thereon.

In Figure 2 a portion of a printing plate member 12 is illustrated with mass 13 molded thereon, the resulting composite member constituting a porous ink retaining printing plate or the like.

Figure 3:
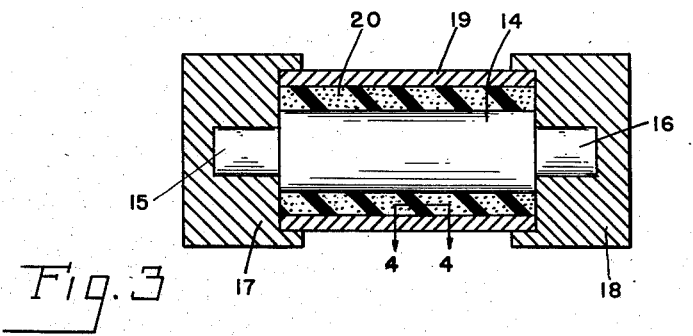
Figure 3 is a view in cross section illustrating the molding of a roll such as is described in Figure 1.

In Figure 3 a steel core member 14 having shaft ends 15 and 16 is housed within a mold formed by end members 17 and 18 and cylindrical member 19. This mold is filled around the core with comminuted rubber compound 20 containing a chemical blowing agent as described above. The resulting assembly is then positioned in a vulcanizing press and subjected to vulcanizing temperatures with the resultant vulcanizing of the rubber and decomposition of the blowing agent. If desired, the gases resulting from the decomposition within the mold may be retained in the mold or may be removed during vulcanization by bleeding them off through a suitable opening.

Figure 4:
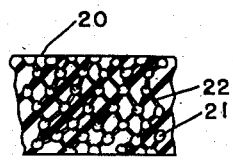
Figure 4 is an enlarged partial cross sectional view taken along lines 4—4 of Figure 3, illustrating the cellular structure of the product.

In Figure 4 an enlarged cross sectional view is taken along lines 4—4 of Figure 3 to illustrate the cell structure of the resulting product. This clearly shows numerous cells 21 formed in rubber body 20, such cells having interconnected pores 22 resulting at least in part from the decomposition of the chemical blowing agent.

Rolls, plates, or other products formed of the porous composition referred to herein, will find application not only in the printing field, but for other purposes involving the application or distribution of fluids. Such applications include coating with paints, varnishes, or the like, and the application of glues, sizes, and other liquid materials. Other uses will be apparent to those skilled in the art.

We claim:

1. As a new product of manufacture an inking roll comprising a body of porous rubber formed of a porous mass of finely divided rubber particles cohered together under the influence of heat and pressure, said particles being further united and bonded to each other by means of a fused solidified thermosetting synthetic resin and defining a porous cell structure having interconnected cells wherein the cell walls contain intercommunicating openings resulting from the disruption of the bonds between adjacent particles by the decomposition of thermally unstable gas releasing material admixed with but separate from the rubber particles, said cells containing ink which is releasable at the surface of said roll upon contact of another object therewith.

2. As a new product of manufacture a porous sponge rubber material having an interconnected cell structure comprising a porous mass of finely divided rubber particles, the particles of which are cohered under the influence of heat and pressure and wherein the cell walls contain intercommunicating openings resulting from the disruption of the bonds between adjacent particles by the decomposition of thermally unstable gas releasing particles admixed with but separate from the rubber particles prior to the application of said heat and pressure.

3. A porous, fluid-absorbing rubber material having a multitude of interconnected cells formed therein, the walls of said cells being defined by a porous mass of discrete finely divided compressed vulcanized individual and discrete rubber particles bonded together by a solidified fused thermosetting synthetic resin, the interconnecting openings between said cells defining gas passages between the bonds of said particles resulting from generation and liberation of gas from gas forming material dispersed in said mass adjacent to but separate from said rubber particles.

4. A method for the manufacture of a porous rubber material having an interconnected cell structure which comprises admixing a mass of finely divided rubber particles with finely divided particles of a chemical blowing agent wherein said particles are intimately mixed with said rubber particles but are separate therefrom, subjecting said mass while in particulate form to elevated temperature sufficient to decompose said blowing agent and simultaneously subjecting said mass to the influence of sufficient pressure to cause cohesion of said rubber particles to form a porous mass, whereby the gases resulting from the decomposition of the blowing agent cause disruption of a portion of the bonds between the cohered particles to form an interconnected cell structure.

5. A method for the manufacture of a porous rubber material having an interconnected cell structure which comprises introducing a mixture including particles of finely divided rubber, separate particles of a thermally unstable blowing agent, and separate particles of a thermosetting resin into a confined space, subjecting said mixture to heat and pressure whereby said rubber particles cohere to form a porous mass and are bonded together by fusion followed by solidification of the thermosetting resin, and simultaneously thermally decomposing the blowing agent to liberate a gaseous material with resultant disruption of at least certain of the cell walls formed by said rubber particles and said resin, and removing the resultant product from said confined space.

6. A method according to claim 5 wherein the mixture is compressed and preformed to at least the dimensions of the mold prior to incorporation therein.

7. A method according to claim 5 wherein the finely divided rubber particles are initially at least partially unvulcanized and become vulcanized during the application of the heat and pressure.

8. A method according to claim 5 wherein the finely divided rubber particles are vulcanized prior to the application of the heat and pressure.

9. A method for the manufacture of porous ink-retaining printing members which comprises admixing a mass of finely divided rubber particles with particles of a chemical blowing agent wherein said chemical blowing agent particles are maintained externally of said rubber particles, enclosing the admixed particulate mass in a closed mold and subjecting said mixture to elevated temperatures sufficient to decompose the blowing agent under the influence of the heat and the pressure resulting therefrom, as well as to effect cohesion between the particles and blowing of the chemical blowing agent with the release of gas, thereby obtaining a porous mass in which the porosity is obtained partly by the pore structure which results from the cohesion of the rubber particles and partly by the disruption of the bonds between such cohered particles as the result of the liberation of the gas.

10. A method according to claim 9 wherein a thermosetting resin is admixed with the finely divided rubber particles and the chemical blowing agent said resin being maintained externally of said rubber particles prior to incorporation within the mold, whereby said rubber particles when subjected to the heat and pressure are caused to be cohered and joined by fusion of the thermosetting resin prior to setting thereof, and whereby an interconnecting cell structure is obtained by disruption of at least a portion of the resin bonds between particles.

11. A method for the manufacture of porous ink-retaining printing members which comprises admixing a mass of finely divided rubber particles with particles of a chemical blowing agent wherein said chemical blowing agent particles are maintained externally of said rubber particles, compressing the admixed particles to form a preformed mass of lesser volume than the original mixture, introducing the preformed mass into a closed mold of greater volume than said mass, and subjecting said mass to elevated temperatures sufficient to decompose the blowing agent under the influence of the heat and the pressure resulting therefrom, as well as to effect cohesion between the particles and blowing of the chemical blowing agent with the release of gas, and simultaneously expanding the mass to fill the mold, thereby obtaining a porous mass in which the porosity is obtained partly by the pore structure which results from the cohesion of the rubber particles and partly by the disruption of the bonds between such cohered particles as the result of the liberation of the gas.

References Cited in the file of this patent

UNITED STATES PATENTS

| | | |
|---|---|---|
| 1,227,791 | Huebner | May 29, 1917 |
| 1,422,884 | Ostberg et al. | July 18, 1922 |
| 1,674,053 | Miller | June 19, 1928 |
| 2,161,308 | Murphy | June 6, 1939 |
| 2,216,581 | Almy | Oct. 1, 1940 |
| 2,349,613 | Chollar | May 23, 1944 |
| 2,353,877 | Chollar | July 18, 1944 |
| 2,371,868 | Berg et al. | Mar. 20, 1945 |
| 2,459,739 | Groten et al. | Jan. 18, 1949 |
| 2,526,311 | Wilson | Oct. 17, 1950 |
| 2,570,182 | Daly | Oct. 9, 1951 |
| 2,598,806 | Lauer | June 3, 1952 |
| 2,632,210 | Olsen et al. | Mar. 24, 1953 |